(12) United States Patent
Marple

(10) Patent No.: US 10,826,060 B2
(45) Date of Patent: Nov. 3, 2020

(54) FLUOROSURFACTANT AS A ZINC CORROSION INHIBITOR

(71) Applicant: Energizer Brands, LLC, St. Louis, MO (US)

(72) Inventor: Jack W. Marple, Avon, OH (US)

(73) Assignee: Energizer Brands, LLC, St. Louis, MO (US)

( * ) Notice: Subject to any disclaimer, the term of this patent is extended or adjusted under 35 U.S.C. 154(b) by 24 days.

(21) Appl. No.: 16/437,429

(22) Filed: Jun. 11, 2019

(65) Prior Publication Data

US 2019/0363355 A1    Nov. 28, 2019

Related U.S. Application Data

(63) Continuation of application No. 15/516,811, filed as application No. PCT/US2015/054489 on Oct. 7, 2015, now Pat. No. 10,381,643.

(60) Provisional application No. 62/061,348, filed on Oct. 8, 2014.

(51) Int. Cl.
| | |
|---|---|
| *H01M 4/42* | (2006.01) |
| *H01M 4/36* | (2006.01) |
| *H01M 4/48* | (2010.01) |
| *H01M 10/24* | (2006.01) |
| *H01M 10/42* | (2006.01) |
| *H01M 12/08* | (2006.01) |
| *H01M 4/02* | (2006.01) |

(52) U.S. Cl.
CPC ............ *H01M 4/42* (2013.01); *H01M 4/366* (2013.01); *H01M 4/48* (2013.01); *H01M 10/24* (2013.01); *H01M 10/4235* (2013.01); *H01M 12/08* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 4,195,120 A | 3/1980 | Rossler et al. | |
| 4,777,100 A | 10/1988 | Chalilpoyil et al. | |
| 5,300,394 A | 4/1994 | Miller et al. | |
| 5,312,476 A | 5/1994 | Uemura et al. | |

(Continued)

FOREIGN PATENT DOCUMENTS

| | | |
|---|---|---|
| AU | 2005225138 A1 | 5/2006 |
| AU | 2004210507 B2 | 10/2009 |

(Continued)

OTHER PUBLICATIONS

International Preliminary Report on Patentability (Chapter I) for International Application No. PCT/US2015/054489, dated Apr. 11, 2017, 7 pages.

(Continued)

*Primary Examiner* — Amanda C. Walke
(74) *Attorney, Agent, or Firm* — Foley & Lardner LLP

(57) ABSTRACT

An alkaline electrochemical cell, preferably a zinc/air cell which includes a container; a negative electrode, a positive electrode, wherein said negative electrode and said positive electrode are disposed within the container, a separator located between the negative electrode and the positive electrode, and an alkaline electrolyte, wherein the negative electrode comprises zinc, and a branched chain fluorosurfactant. The fluorosurfactant is preferably a sulfotricarballylate surfactant with multiple fluorinated end groups.

18 Claims, 4 Drawing Sheets

(56) References Cited

U.S. PATENT DOCUMENTS

| | | |
|---|---|---|
| 5,378,562 A | 1/1995 | Passaniti et al. |
| 5,401,590 A | 3/1995 | Chalilpoyil et al. |
| 5,419,977 A | 5/1995 | Weiss |
| 5,464,709 A | 11/1995 | Getz et al. |
| 5,677,084 A | 10/1997 | Tsukamoto et al. |
| 6,203,943 B1 | 3/2001 | Bennett et al. |
| 6,551,742 B1 | 4/2003 | Huq et al. |
| 6,602,629 B1 | 8/2003 | Guo et al. |
| 6,780,347 B2 | 8/2004 | Ndzebet |
| 6,872,489 B2 | 3/2005 | Armacanqui et al. |
| 6,939,630 B2 | 9/2005 | Sotomura et al. |
| 6,967,038 B2 | 11/2005 | O'Brien |
| 7,005,213 B2 | 2/2006 | Ndzebet et al. |
| 7,008,723 B2 | 3/2006 | Daniel-Ivad et al. |
| 7,208,248 B2 | 4/2007 | Hayashi et al. |
| 7,563,537 B2 | 7/2009 | Pratt et al. |
| 7,615,508 B2 | 11/2009 | Kaplan et al. |
| 7,754,381 B2 | 7/2010 | Fujino et al. |
| 7,993,508 B2 | 8/2011 | Stimits et al. |
| 8,586,244 B2 | 11/2013 | Fensore et al. |
| 8,652,685 B2 | 2/2014 | Guo |
| 8,945,736 B2 | 2/2015 | Uensel et al. |
| 8,999,874 B2 | 4/2015 | Kishimoto et al. |
| 9,136,540 B2 | 9/2015 | Padhi et al. |
| 2004/0229107 A1 | 11/2004 | Smedley |
| 2005/0123833 A1 | 6/2005 | Schubert et al. |
| 2005/0287438 A1 | 12/2005 | Bernard |
| 2006/0068288 A1 | 3/2006 | Johnson |
| 2007/0048576 A1 | 3/2007 | McKenzie et al. |
| 2007/0092429 A1 | 4/2007 | Mao et al. |
| 2007/0122699 A1 | 5/2007 | Pratt |
| 2007/0154704 A1 | 7/2007 | Debergalis et al. |
| 2007/0160898 A1 | 7/2007 | Takamura et al. |
| 2008/0096074 A1 | 4/2008 | Wu |
| 2008/0155813 A1 | 7/2008 | Dopp et al. |
| 2008/0241683 A1 | 10/2008 | Fensore |
| 2009/0320718 A1 | 12/2009 | Hierse et al. |
| 2011/0033747 A1 | 2/2011 | Phillips et al. |
| 2011/0143253 A1 | 6/2011 | Miyata et al. |
| 2011/0265669 A1 | 11/2011 | Padberg |
| 2011/0287305 A1 | 11/2011 | Scordilis-Kelley |
| 2012/0111233 A1 | 5/2012 | Hierse et al. |
| 2013/0162216 A1 | 6/2013 | Zhamu |
| 2014/0099539 A1 | 4/2014 | Yamazaki |
| 2014/0170478 A1 | 6/2014 | Liao |
| 2014/0239239 A1 | 8/2014 | Cha et al. |
| 2015/0244000 A1 | 8/2015 | Ozaki et al. |
| 2017/0012317 A1 | 1/2017 | Fukuta |
| 2017/0237133 A1 | 8/2017 | Marple |

FOREIGN PATENT DOCUMENTS

| | | |
|---|---|---|
| CA | 2216823 A1 | 3/1998 |
| CA | 2716012 A1 | 10/2009 |
| CA | 2321313 C | 12/2009 |
| CA | 2795492 A1 | 10/2011 |
| CA | 2472557 C | 12/2014 |
| DE | 102006031143 A1 | 1/2008 |
| EP | 2053674 B1 | 12/2012 |
| EP | 2654107 A1 | 10/2013 |
| WO | WO 2003/052843 A2 | 6/2003 |
| WO | WO 2008/051508 A2 | 5/2008 |
| WO | WO 2009/016521 A2 | 2/2009 |
| WO | WO 2016/065230 A1 | 4/2016 |

OTHER PUBLICATIONS

International Search Report and Written Opinion for International Application No. PCT/US2015/057063, dated Jan. 22, 2016, 6 pages.

Usui, Hiroyuki, et al., "Novel Composite Thick-Film Electrodes Consisted of Zinc Oxide and Silicon for Lithium-Ion Battery Anode", International Journal of Electrochemical Science, May 1, 2012, pp. 4322-4334, vol. 7, retrieved from < Novel Composite Thick-Film Electrodes Consisted of Zinc Oxide and Silicon for Lithium-Ion Battery Anode > on Apr. 19, 2017.

International Search Report and Written Opinion for International Application No. PCT/US2015/054489, dated Dec. 29, 2015, 8 pages.

Schellenberger, Steffen, et al., "A New Generation of High-Speed Fluorosurfactants", PCI Magazine, May 1, 2013 (previously published in European Coatings Journal on Nov. 2012), 7 pages, retrieved from < http://www.pcimag.com/articles/97759-a-new-generation-of-high-speed-fluorosurfactants > on Mar. 9, 2017.

Basf, "Kollicoat IR: Polyvinyl alcohol-polyethylene glycol graft copolymer for instant-release coatings and quick-dissolving formulations," BASF Technical Information, Feb. 2013, 14 pages, retrieved from <https://www.google.com/?gws_rd=ssl#q=kollicoat+ir+technical+information+basf+2013> on Jan. 14, 2017.

Toon, John, "Smart Hydrogel Coating Creates "Stick-slip" Control of Capillary Action," Georgia Tech News Center, Jul. 27, 2015, 5 pages, retrieved from <http://www.news.gatech.edu/2015/07/25/smart-hydrogel-coating-creates-%E2%80%9Cstick-slip%E2%80%9D-control-capillary-action> on Jan. 14, 2017.

Pfeffer, Robert, et al., "Synthesis of Engineered Particulates with Tailored Properties Using Dry Particle Coating," Powder Technology 117, 2001, 40-67.

Yang, Jun, et al., "Dry Particle Coating for Improving the Flowability of Cohesive Powders," Powder Technology 158, 2005, 21-33.

Neburchilov, Vladimir, et al., "A Review on Air Cathodes for Zinc-Air Fuel Cells," Journal of Power Source-195, 2010, 1271-1291.

Pund, K., "Recovery Act: Nanoengineered Ultracapacitor Material Surpasses the $/kW Threshold for Use in EDV' s," EnerG2, May 16, 2012. http://www1.eere.energy.gov/vehiclesandfuels/pdfs/merit_review_2012/energy_storage/arravt011_es_pund_2012_p.pdf.

ENERG2 Press Release "EnerG2 nano-structured hard carbon boosts Li-ion anode capacity by >50% compared to standard graphite," Mar. 27, 2013, http://www.greencarcongress.com/2013/03/energ2-20130327.html.

U.S. Appl. No. 15/516,811, Non-Final Office Action dated Jul. 27, 2018.

U.S. Appl. No. 15/521,223, Non-Final Office Action dated Jul. 27, 2018.

Office Action for U.S. Appl. No. 15/516,811 dated Jan. 11, 2019, 10 pages.

Control zinc without surfactant 10Kx     Zinc with Tivida added 10Kx

FLUOROSURFACTANT AS A ZINC CORROSION INHIBITOR

CROSS-REFERENCE TO RELATED APPLICATIONS

This application is a continuation of U.S. application Ser. No. 15/516,811 filed Apr. 4, 2017, which is a National Stage Application, filed under 35 U.S.C. § 371, of International Application No. PCT/US2015/054489, filed Oct. 7, 2015, which claims priority to U.S. Provisional Application No. 62/061,348, filed Oct. 8, 2014; the contents of each of which are hereby incorporated by reference in their entirety.

BACKGROUND

Related Field

The present invention relates to a negative electrode and to an alkaline electrochemical cell comprising the negative electrode, wherein the negative electrode includes zinc as an active material and further includes a hydrogen gas inhibiting surfactant. More particularly, the invention discloses an alkaline electrochemical cell that is capable of providing improved service when utilized by high drain devices.

Description of Related Art

The alkaline zinc air cell system is particularly sensitive to zinc stability and low gassing rates. Any buildup of either hydraulic or pneumatic pressure within the anode compartment can result in failure of the air electrode as electrolyte is forced into the critical solid-gas-liquid reaction sites. Excessive electrolyte within the air electrode further leads to a decrease in its tensile strength, which can result in a higher resistance in the electrode to can contact as well as an oxygen diffusion barrier film at the PFTE membrane to electrode interface. This is typically observed as a sloping end of life discharge as polarization increases from lack of effective oxygen reduction within the air electrode matrix.

The alkaline battery industry has a long history of defining anode additives, with the intent of stabilize or minimizing zinc corrosion. This is particularly true since the elimination of mercury from alkaline battery products. For the most part corrosion has been controlled through the addition of surfactants also referred to as wetting and dispersing additives. Identifying and qualifying new additives is challenging since it is not the intent of the manufacturers of these surfactants that they be used as film formers on the surface of zinc or at zinc grain boundaries, or minimizing the reaction of water and zinc, particularly with high surface area zinc alloys. The selection of the preferred additive is further complicated by the fact that different zinc based chemistries, cell form factors, application drains, shelf life claims, sensitivities to gas generation, and anode processing differences such as gels and powdered forms has led to a wide variation in specifications. Surfactants and dispersion aids can serve more than one function. Some additives are used primarily to influence rheology properties while possessing a secondary effect of reducing zinc corrosion.

U.S. Pat. No. 4,777,100 relates to reportedly reducing corrosion in aqueous electrochemical cells having zinc anodes comprised of single crystal zinc particles by the addition of small amounts of a gas inhibiting surfactant, for example, an organic phosphate inhibitor such as RA600 from GAF Corp. to the cell. A synergistically lowered rate of corrosion and cell gassing is reportedly obtained even with reduction of mercury content.

U.S. Pat. No. 5,401,590 relates to a method for inhibiting the occurrence of load voltage instability in zinc anodic alkaline cells. The anode active material contains a gelled slurry of zinc alloy particles, a gelling agent, an aqueous alkaline solution and a mixed surfactant containing an anionic surfactant and a nonionic surfactant. The gelled anode active material reportedly inhibits the occurrence of load voltage instability and reportedly simultaneously reduces hydrogen evolution even though the cell contains no added amounts of mercury.

U.S. Pat. No. 6,551,742 relates to an anionic fluorosurfactant, such as an anionic fluoroaliphaticcarboxylate, can be added to the anode mixture of a zinc/air cell. The addition of the surfactant and a heat treated anode casing eliminates the need to add mercury to the anode material.

U.S. Pat. No. 6,872,489 discloses a sulfonic acid type organic surfactant which is incorporated into the gelled anode of an alkaline electrochemical cell, optionally with an organic phosphate ester surfactant. When the two surfactants are provided in a gelled anode in combination, discharge leakage is reportedly reduced and gel gassing is reportedly suppressed relative to that of gels lacking both surfactants. Additionally, cell discharge performance is reportedly improved relative to that of cells lacking both surfactant additives.

U.S. Pat. No. 7,008,723 relates to a method of manufacturing an anode composition for use in an electrochemical cell, in which the anode comprises an electrochemically active material, the method comprising the steps of mixing the electrochemically active material with an alkaline electrolyte solution, an organic surfactant, an indium compound, and a gelling agent, such that the indium compound or a portion thereof is added in an alkaline environment.

U.S. Pat. No. 7,993,508 discloses an alkaline zinc air cell that contains either a surfactant Carbowax c 550, or a surfactant Disperbyk r D102.

U.S. Pat. No. 8,586,244 relates to electrochemical cells wherein the negative electrode includes zinc as an active material and further includes a reported synergistic combination of a solid zinc oxide and a surfactant.

WO 2003052843 A2 relates to an alkaline electrochemical cell that contains an oxazoline surfactant additive.

BRIEF SUMMARY

According to a first aspect of the present invention, an embodiment of the invention can include any one or a combination of the following features: An alkaline electrochemical cell, comprising a container; a negative electrode, a positive electrode, wherein the negative electrode and the positive electrode are disposed within the container and, a separator located between the negative electrode and the positive electrode, and an alkaline electrolyte, wherein the negative electrode comprises zinc, and a sulfotricarballylate surfactant. The sulfotricarballylate surfactant is a fluorosurfactant is of the formula (I)

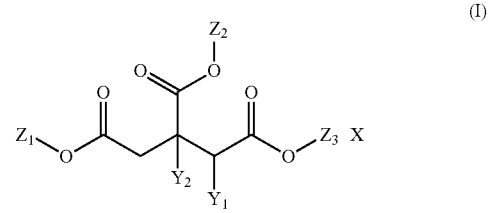

where the groups $Z_i(Z_1, Z_2,$ and $Z_3)$ are, independently of one another, branched or unbranched alkyl groups or groups of the structure $R_f(A(CR_1R_2)_{ci}-(CR_3R_4)_{c'i})_{di}-$, where the respective indices ci and c'i are, independently of one another, 0-10, and di=0-5, where $R_f$ is a branched or unbranched, fluorine-containing alkyl radical, $R_1$ to $R_4$ are, independently of one another, hydrogen or a branched or unbranched alkyl group, ci and c'i are not simultaneously 0, and A=O, S and/or N. $Y_1$ is an anionic polar group and $Y_2$ is a hydrogen atom, or vice versa, X is a cation, and at least one of the groups $Z_i$ is a group of the structure $R_f(A(CR_1R_2)_{ci}-(CR_3R_4)_{c'i})_{di}-$. The sulfotricarballylates surfactant preferably has a molecular weight of about between 800 and 1320.

In another embodiment, the sulfotricarballylate surfactant included to suppress corrosion of the zinc in the negative electrode of the alkaline cell is characterized by the formula (Ia)

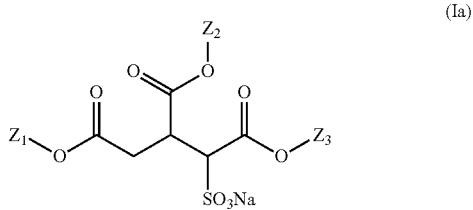

and where $Z1=Z2=Z3=F_3C(CF_2)_{ai}(CH_2)_{bi}(O(CH_2)_{ci})_{di}-$, where ai=1-2, bi=1-2, ci=2, di=1-3. Alternatively, $Z1=Z2=Z3=F_3C(CF_2)CH_2)(O(CH_2CHCH_2CH_3))$.

In the embodiment, the sulfotricarballylates contains more than one fluorinated end groups, and all of the fluorinated end groups can be identical. Preferably the sulfotricarballylate surfactant comprises three fluorinated end groups. Each fluorinated end group can include a fluorinated carbon chain such as $F_3C(CF_2)_2$ and $F_3C(CF_2)$. In the embodiment wherein the sulfotricarballylate surfactant comprises three fluorinated end groups, each end group can comprise such a fluorinated carbon chain.

The sulfotricarballylates surfactant is in the form of a mixture, and added so as to be present in the cell in an amount from 10 to 1000 ppm based on the total weight of the zinc. Preferably the concentration of the sulfotricarballylate in the cell is present in an amount from 10 to 200 ppm, or 10 to 100 ppm based on the total weight of the zinc, and most preferably in an amount from 10 to 40 ppm based on the total weight of the zinc. When added to the negative electrode of the alkaline electrochemical cell the sulfotricarballylate surfactant can form a monolayer on the surface of the zinc so as to inhibit corrosion of the zinc.

These and other features, advantages, and objects of the present invention will be further understood and appreciated by those skilled in the art by reference to the following specification, claims, and appended drawings.

DETAILED DESCRIPTION OF VARIOUS EMBODIMENTS

Figure 1:
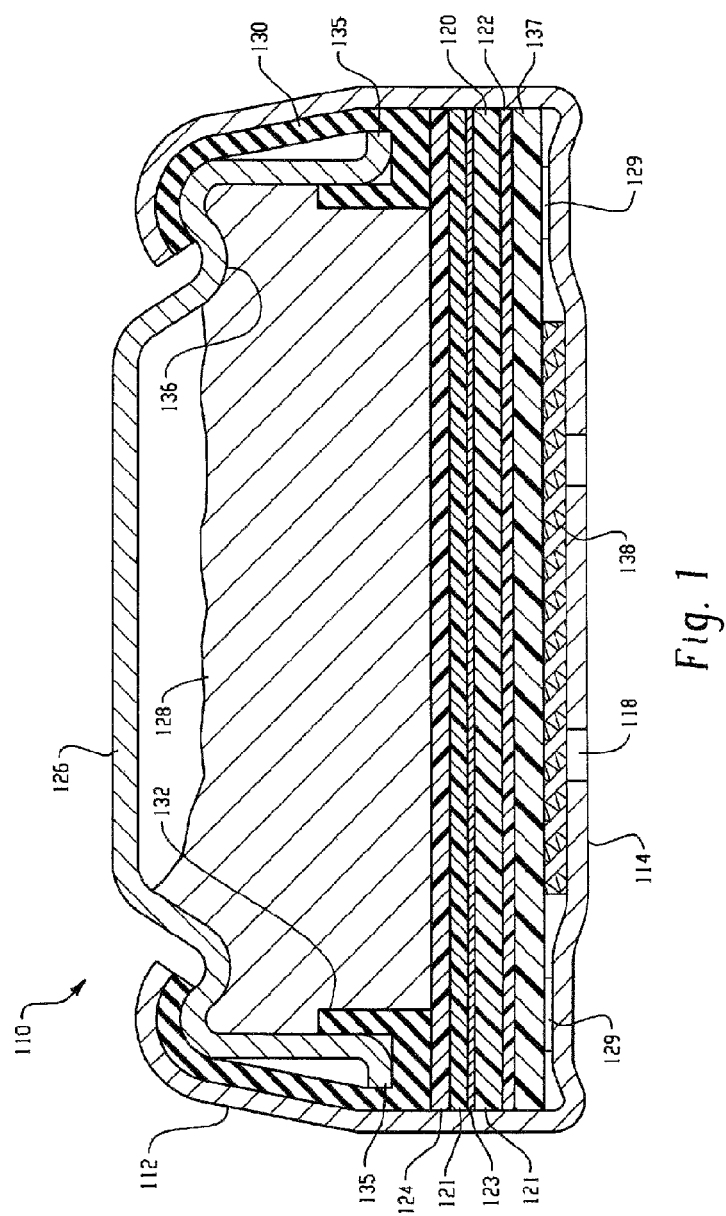
FIG. 1 is an elevational view, in cross-section, of a metal-air cell with a catalytic electrode.

As shown in an example of an electrochemical cell according to the invention is shown in FIG. 1. The cell 110 can include a cathode casing 112 and an anode casing 126. At least one aperture 118 is present in the cathode casing 112 to act as an air or oxygen entry port. A catalytic positive electrode (such as an air electrode) 120 is disposed near the aperture 118 in the cathode casing 112. The catalytic electrode 120 can include a catalytic layer containing a mixture of carbon, a catalyst, and a binder. Catalytic electrode 120 preferably has a barrier layer 122 laminated thereon. The barrier layer 122 can be laminated on the side of the catalytic electrode closest to the aperture 118 cell. Catalytic electrode 120 can contain an electrically conductive current collector 123 embedded therein, preferably on the side of the electrode opposite the barrier layer 122. The cell 110 may optionally contain a second barrier layer 137 between the first barrier layer 122 and central region 114 of the surface of the cathode casing 112 containing the aperture 118. The barrier layers 122, 137 have a low enough surface tension to be resistant to wetting by electrolyte, yet porous enough to allow oxygen to enter the electrode at a rate sufficient to support the desired maximum cell reaction rate. At least one layer of separator 124 is positioned on the side of the catalytic electrode 120 facing the anode 128. The separator 124 is ionically conductive and electrically nonconductive. The total thickness of the separator 124 is preferably thin to minimize its volume, but must be thick and strong enough to prevent short circuits between the anode 128 and catalytic electrode 120. The separator 124 can be adhered to the surface of the catalytic electrode 120 to provide good ion transport between the electrodes and to prevent the formation of gas pockets between the catalytic electrode 120 and the separator 124. Similarly, adjacent layers of the separator 124 can be adhered to each other. A layer of porous material 138 can be positioned between catalytic electrode 120 and the surface of casing 112 to evenly distribute oxygen to electrode 120. A sealant 129 can be used to bond portions of the catalytic electrode 120 to the cathode casing 112. The anode casing 126 can have a rim 135 that is flared outward at its open end. Alternatively, a cell can essentially straight side walls with little or no outward flare or a rim that is folded outward and back along the side wall to form a substantially U-shaped side wall with a rounded edge at the open end of the casing. The anode casing 126 can have an inner surface 136 in contact with the anode mixture 128 and electrolyte. Cell 110 can includes a gasket 130, made from an elastomeric material for example, to provide a seal between the cathode casing 112 and anode casing 126. The bottom edge of the gasket 130 can be formed to create an inwardly facing lip 132, which abuts the rim of anode casing 126. Optionally, a sealant may be applied to the sealing surfaces of the gasket 130, cathode casing 112 and/or anode casing 126. A suitable tab (not shown) can be placed over the openings 118 until the cell 110 is ready for use, to keep air from entering the cell 110 before use.

A catalytic layer 121 contains a catalytic composition that includes composite particles comprising nano-catalyst particles adhered to (e.g., adsorbed onto) the external and internal surfaces (including surfaces of open pores) of highly porous carbon substrate particles.

Examples of zinc air cell cathode construction that can be used in conjunction with the present invention are disclosed in U.S. Patent Application Publication No. 2008/0155813 A1.

The anode casing 126 forms the top of the cell and has a rim 135 which is flared outward at its open end. Alternatively, a cell can have a refold anode casing in which the rim is folded outward and back along the side wall to form a substantially U-shaped side wall with a rounded edge at the open end of the casing, or the anode casing can have essentially straight side walls and that has a rim with little or no outward flare.

The anode casing 126 can be formed from a substrate including a material having a sufficient mechanical strength for the intended use such as stainless steel, mild steel, cold rolled steel, aluminum, titanium or copper. Preferably the anode casing includes one or more additional layers of material to provide good electrical contact to the exterior surface of the anode casing 126, resistance of the external surface to corrosion, and resistance to internal cell gassing where the internal surface of the anode casing 126 comes in contact with the anode 128 or electrolyte. Each additional layer can be a metal such as nickel, tin, copper, or indium, or a combination or alloy thereof, and layers can be of the same or different metals or alloys. Examples of plated substrates include nickel plated steel, nickel plated mild steel and nickel plated stainless steel. Examples of clad materials (i.e., laminar materials with at least one layer of metal bonded to another layer of metal) include, as listed in order from an outer layer to an inner layer, two-layered (biclad) materials such as stainless steel/copper, three-layered (triclad) materials such as nickel/stainless steel/copper and nickel/mild steel/nickel, and materials with more than three clad layers.

The anode casing 126 can include a layer that is post-plated (i.e., plated after forming the anode casing into its desired shape). The post-plated layer is preferably a layer of metal with a high hydrogen overvoltage to minimize hydrogen gassing within the cell 110. Examples of such metals are copper, tin, zinc, indium and alloys thereof. A preferred metal is tin, and a preferred alloy is one comprising copper, tin and zinc.

Cell 110 also includes a gasket 130 made from an elastomeric material which serves as the seal. The bottom edge of the gasket 130 has been formed to create an inwardly facing lip 132, which abuts the rim of anode casing 126. Optionally, a sealant may be applied to the sealing surface of the gasket, cathode casing and/or anode casing. Suitable sealant materials will be recognized by one skilled in the art. Examples include asphalt, either alone or with elastomeric materials or ethylene vinyl acetate, aliphatic or fatty polyamides, and thermoplastic elastomers such as polyolefins, polyamine, polyethylene, polypropylene and polyisobutene.

During manufacture of the cell, anode casing 126 can be inverted, and then a negative electrode composition or anode mixture 128 and electrolyte put into anode casing 126. The anode mixture insertion can be a two-step process wherein dry anode mixture materials are dispensed first into the anode casing 126 followed by KOH solution dispensing. Alternatively, the wet and dry components of the anode mixture are preferably blended beforehand and then dispensed in one step into the anode casing 126. Electrolyte can creep or wick along the inner surface 136 of the anode casing 126, carrying with it materials contained in anode mixture 128 and/or the electrolyte.

An example of an anode mixture 128, for a button cell comprises a mixture of zinc, electrolyte, and organic compounds. The anode mixture 128 preferably includes zinc powder, a binder such as CARBOPOL® 940 or CARBOPOL® 934, and a gassing inhibitor such as indium hydroxide ($In(OH)_3$) in amounts of about 99.7 weight percent zinc, about 0.25 weight percent binder, and about 0.045 weight percent indium hydroxide. CARBOPOL® 934 and CARBOPOL® 940 are acrylic acid polymers in the 100% acid form and are available from Noveon Inc. of Cleveland. Ohio.

The electrolyte composition for a button cell can be a mixture of about 97 weight percent potassium hydroxide (KOH) solution where the potassium hydroxide solution is 28-40 weight percent, preferably 30-35 weight percent, and more preferably about 33 weight percent aqueous KOH solution, and about 3.00 weight percent zinc oxide (ZnO).

The electrolyte composition for a prismatic cell can be a mixture of about 97 weight percent potassium hydroxide (KOH) solution where the potassium hydroxide solution is about 28 to about 40 weight percent, preferably about 30 to about 35 weight percent, and more preferably about 33 weight percent aqueous KOH solution, and about 1.00 to 3.00 weight percent zinc oxide (ZnO).

Preferred zinc powders are low-gassing zinc compositions suitable for use in alkaline cells with no added mercury. Examples are disclosed in U.S. Pat. No. 6,602,629 (Guo et al.), U.S. Pat. No. 5,464,709 (Getz et al.) and U.S. Pat. No. 5,312,476 (Uemura et al.), which are hereby incorporated by reference.

One example of a low-gassing zinc is ZCA grade 1230 zinc powder from Zinc Corporation of America, Monaca, Pa. which is a zinc alloy containing about 400 to about 550 parts per million (ppm) of lead. The zinc powder preferably contains a maximum of 1.5 (more preferably a maximum of 0.5) weight percent zinc oxide (ZnO). Furthermore, the zinc powder may have certain impurities. The impurities of chromium, iron, molybdenum, arsenic, antimony, and vanadium preferably total 25 ppm maximum based on the weight of zinc. Also, the impurities of chromium, iron, molybdenum, arsenic, antimony, vanadium, cadmium, copper, nickel, tin, and germanium preferably total no more than 68 ppm of the zinc powder composition by weight. More preferably, the zinc powder contains no more than the following amounts of iron, cadmium, copper, tin, chromium, nickel, molybdenum, arsenic, vanadium, antimony, and germanium, based on/the weight of zinc: Fe—3.0 ppm, Cd—8 ppm, Cu—8 ppm, Sn—1 ppm, Cr—1 ppm, Ni—1 ppm, Mo—0.25 ppm, As—0.1 ppm, Sb—0.2 ppm, V—1 ppm, and Ge—0.06 ppm.

In another embodiment, the zinc powder preferably is a zinc alloy composition containing bismuth, indium and aluminum. The zinc alloy preferably contains about 100 ppm of bismuth, 200 ppm of indium, and 100 ppm of aluminum. The zinc alloy preferably contains a low level of lead, such as about 35 ppm or less. In a preferred embodiment, the average particle size ($D_{so}$) is about 90 to about 120 microns. Examples of suitable zinc alloys include product grades NGBIA 100, NGBIA 115, and BIA available from N.V. Umicore, S.A., Brussels, Belgium.

The selection of zinc additives, for corrosion control, can be very challenging. Since these additives are often surfactants which have interactions with other components, they can influence viscosity and rheology properties. Surfactants form films on the zinc surface which impact cell impedance and rate capability, and can influence the solubility of ZnO. They are often extremely concentration dependent which further complicates their evaluation. Surfactants used in zinc air cell anode formulations such as Disperbyk 102 and Carbowax 550 are extremely concentration sensitive and have significant impact on front end rate capability and cell impedance. It is desired to use a zinc additive which forms a thin but dense film on the zinc surface and is robust to concentration effects above the monolayer requirement.

In order to find a zinc additive that provides a thin but dense film on the surface of zinc which effectively reduces corrosion without having a negative impact on cell impedance and high rate performance, a sulfotricarballylate which is a fluorosurfactant with short chain, branched fluorocarbon end groups and carboxylate acid anchor groups was used as a zinc additive in an alkaline zinc air cell. The sulfotricarballylate is available as Tivida L2300 from EMD Millipore, also known as Merck Millipore outside the United States and Canada.

A first embodiment relates to alkaline cells with zinc additive compounds of the formula (I).

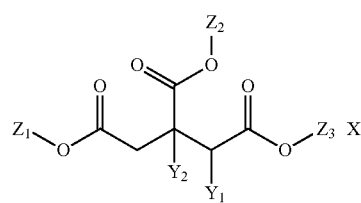

(I)

where the groups $Z_i(Z_1, Z_2,$ and $Z_3)$ are, independently of one another, branched or unbranched alkyl groups or groups of the structure $R_i(A(CR_1R_2)_{ci}—(CR_3R_4)_{c'i})_{di}—$, where the respective indices ci and c'i are, independently of one another, 0-10, and di=0-5, where $R_i$ is a branched or unbranched, fluorine-containing alkyl radical, $R_1$ to $R_4$ are, independently of one another, hydrogen or a branched or unbranched alkyl group, ci and c'i are not simultaneously 0, and A=O, S and/or N, $Y_1$ is an anionic polar group and $Y_2$ is a hydrogen atom, or vice versa, X is a cation, and at least one of the groups $Z_i$ is a group of the structure $R_i(A(CR_1 R_2)_{ci}—(CR_3R_4)_{c'i})_{di}—$. It is preferred for formula (I) that di>0 if $Z_1$, $Z_2$, and $Z_3$ are all a group of the structure $R_i (O(CH_2)_{c'i})_{di}$ and all $R_i$ are selected from $CF_3CF_2CH_2—$, $CF_3CF_2CH_2CH_2—$, $CF_3CF_2CF_2CH_2—$ or $H(CF_2)_4CH_2—$.

The radicals $R_i$ are branched or unbranched, fluorine-containing alkyl groups. The radicals $R_i$ may be partly or perfluorinated and preferably contain terminal perfluorinated groups. Preference is given to branched or unbranched, fluorine-containing alkyl groups having 1 to 10 C atoms. Unbranched fluorine-containing alkyl groups preferably contain 1 to 6 C atoms, in particular 1-4 C atoms. Branched fluorine-containing alkyl groups preferably contain 3 to 6 C atoms, in particular 3-4 C atoms. The branched fluorine-containing alkyl groups used are preferably $(CF_3)_2$—CH— or $(CF_3)_3$—C— groups.

Another embodiment relates to alkaline cells with zinc additive compounds of the formula (Ia)

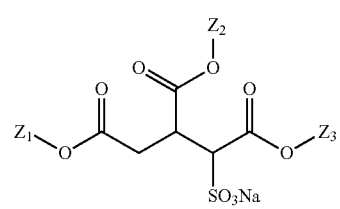

(Ia)

are, in particular, compounds in which all variables have the preferred meanings. Preference is explicitly given to compounds in which $Z_1=Z_2=Z_3=F_3C(CF_2)_{ai}(CH_2)_{bi}(O (CH_2)_{ci})_{di}—$, where ai=1-2, bi=1-2, ci=2, di=1-3, and the anionic polar grout is a sulfonate group $—SO_3—$, and associated with a sodium ion.

Still another embodiment relates to alkaline cells with zinc additive compounds of the formula (Ib).

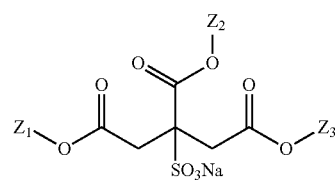

(Ib)

Preferred compounds of the formula (Ib) where $Z_1=Z_2=Z_3$ and all $Z_i$ are selected from $R_i(O(CH_2)_{ci})_{di}—$, where ci=2, di=1-3, and $R_i=CF_3CF_2CH_2—$ or $CF_3CF_2CF_2CH_2—$.

The compounds of the formulas I, Ia and formula Ib are referred to in the present invention as sulfotricarballylates and are based on esters of aconitic acid, onto the double bond of which a sulfonate group has been added. In particular, sulfotricarballylates containing three fluorinated end groups according to the invention are preferred. The compounds of the formula (I) according to the invention can also be in the form of mixtures, particularly also in the form of isomer mixtures (constitutional and/or configurational isomer mixtures). In particular, diastereomer and/or enantiomer mixtures are possible. Examples of sulfotricarballylates and their synthesis are disclosed in U.S. Patent Application Publication No. 2012/0111233 A1.

The sulfotricarballylate compounds of the formulas I, Ia and formula Ib containing more than one fluorinated end groups are preferred. The sulfotricarballylate compounds can have a molecular weight preferably between 800 and 1320, most preferably between 850 and 1000. The sulfotricarballylate compounds when added to an alkaline zinc electrode form a monolayer on the surface of the zinc the width of which can be estimated. It is preferred that this monolayer be as thin as possible so as to minimize polarization. Long chain surfactants because of their structure will have much thicker monolayers. Preferred monolayer thickness is less than 50 Angstroms, and it is most preferred to have a monolayer thickness less than 25 angstroms.

A number of approaches have been proposed to screen zinc corrosion reduction additives. These include: a gel expansion test, a zinc gas generation test, measurement of anode impedance at both low and high frequency which provides information on the thickness and ion mobility associated with film formation on the surface of zinc, SEM images of zinc morphology, and whole cell performance and shelf characterization.

EXAMPLES

The following non-limiting examples are provided to further illustrate the present disclosure.

Example 1

Zinc additives of interest were assembled and associated hydrogen generation was measured per a ten gram gassing test. Average gas generation was measured for ten grams of zinc over three days at 45 C and reported as ul/g/day. The ten gram gassing test consists of measuring the gas generation of zinc (with or without a zinc additive) in an electrolyte solution. The electrolyte solution is prepared by first taking 500 ml of 45% KOH solution and then adding 160 mls of water and 75 grams of ZnO. Ten grams of the zinc along with any zinc additive are added to a reaction vessel along with 5 ml of the electrolyte solution and a small amount of light mineral oil. The reaction vessel is adapted so that evolved hydrogen gas can be measured. The reaction vessel is added to a 45 C water bath and allowed to come up to temperature. After three days the hydrogen gas is measured and recorded and ul/g/day is calculated. The additives studied are shown in Table 1.

TABLE 1

| Material | Chemical information |
| --- | --- |
| Tivida L2300 | sulfotricarballylate |
| Epikure 8538Y68 | Polyethylene polyamine |
| Tomamine E14-2 | Ethoxylated Amine |
| Disperbyk 102 | Poly(oxy ethanediyl) isotridecyl hydroxy phosphate |
| Alkaterge T | Oxazoline |
| MPEG 550 | Methoxypolyethylene Glycol |
| SHMP | Sodium Hexametaphosphate |

The above zinc additives evaluated at different concentrations. In all experiments the surfactant concentration is relative the weight of the zinc powder. Two zincs were used: Mitsui 81207-21 zinc, with full particle size distribution, and Grillo BIA zinc which is pre-screened to be greater than 300 microns in particle size.

Figure 2:
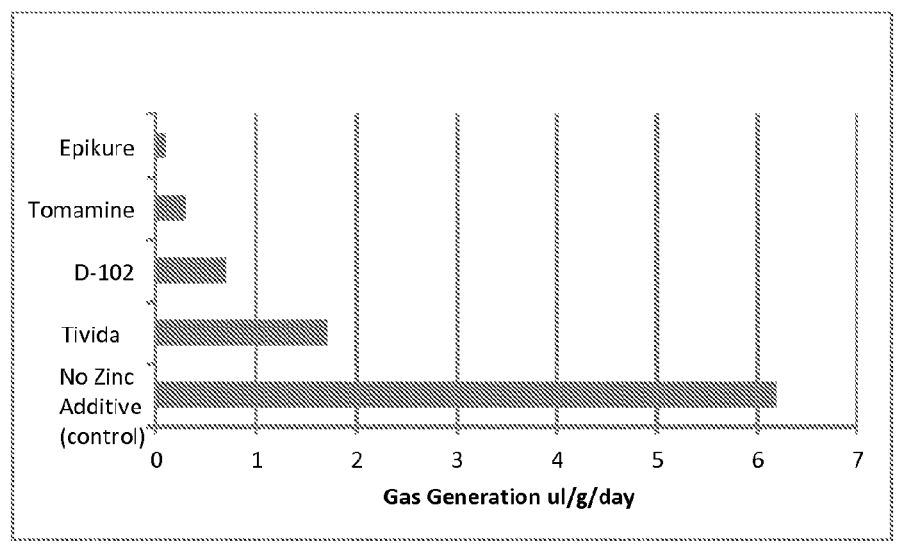
FIG. 2 is an illustration of the results of Example 1 showing the gas generation of various samples.

FIG. 2 includes a graph showing the average gas generation rates for the listed additives. Each zinc additive was evaluated at 100 ppm concentration relative a control that had no zinc additive added. This initial screen shows significant gassing reduction relative the control for all the additives and suggested that these zinc additives should be further evaluated in actual cells to better understand their impact on impedance and high rate pulse requirements.

In Table 2, results from a continued gas generation experiment are shown as a percent of control. In general the Grillo zinc demonstrated much lower gassing rates, about 35% of Mitsui, and thus the additives had less impact when evaluated with the Grillo zinc.

TABLE 2

| Additive | % Gassing Rate of Ref. | Zinc |
| --- | --- | --- |
| Tivida 10 ppm | 100% | Grillo |
| Epikure 20 ppm | 59% | Grillo |
| Tomamine 20 ppm | 59% | Grillo |
| Alkaterge T 100 ppm | 55% | Grillo |
| Tivida 50 ppm | 27% | Mitsui |
| Alkaterge T 20ppm | 22% | Mitsui |
| D-102 100 ppm | 11% | Mitsui |
| Tomamine 100 ppm | 5% | Mitsui |
| Epikure 100 ppm | 0% | Mitsui |

This gas generation test was interpreted strictly as a screen with results sensitive to the zinc and with considerable test to test variation. The reported values represent the average of three tests per additive. While it is the goal to minimize zinc corrosion it should be understood that the most effective additives will most likely have a negative impact on cell impedance and high rate performance. Thus the goal is to find a zinc additive that meets the objective of reducing zinc corrosion while enabling cell performance.

Example 2

Figure 3:
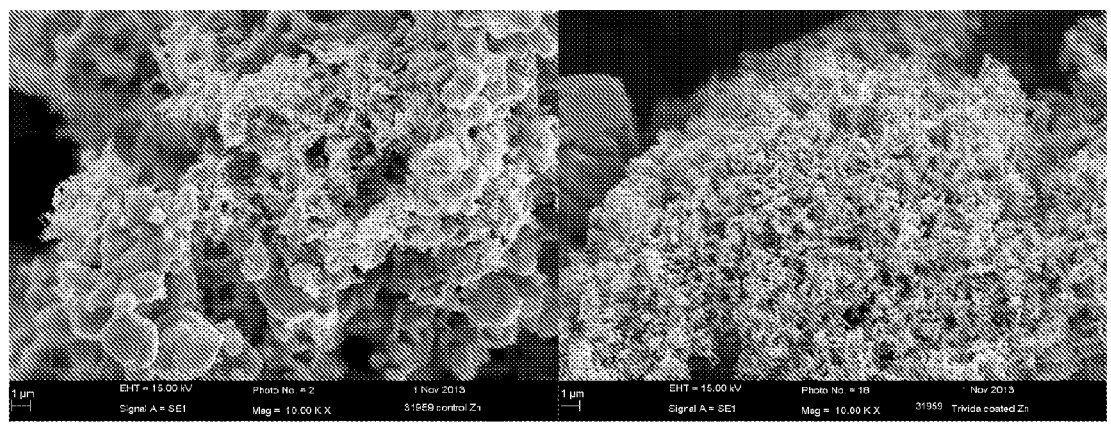
FIG. 3 is scanning electron microscope pictures of zinc with and without the surfactant of the present invention as described in Example 2.

Referring to FIG. 3, SEM Images of Zinc Morphology are show. The surface morphology of the zinc is can be influenced by how the sample is prepared, handled, particle(s) chosen for magnification at 10K×, and storage time between preparation and characterization. Samples were prepared by first discharging 0.5 g of zinc at 100 mA for 3500 seconds followed by charging at 200 mA for 1750 seconds. The zinc was then washed three times in methanol and air dried. The images below suggest that sulfotricarballylates may well influence the surface morphology as the zinc with the sulfotricarballylates appears different than the control without surfactant.

Example 3

Since all of the additives demonstrated a reduction in zinc corrosion, they were all evaluated in AZ13 size air cells at a concentration of 40 ppm. This level was chosen at twice the typical level to magnify the impact on cell characteristics. It may be noted that the level of sulfotricarballylates in the following summaries may be shown at either 100 ppm or 50 ppm and 40 ppm or 20 ppm. The sulfotricarballylates supplied under the Tivida trade name was supplied in a carrier solvent at about 50% concentration.

Figure 4:
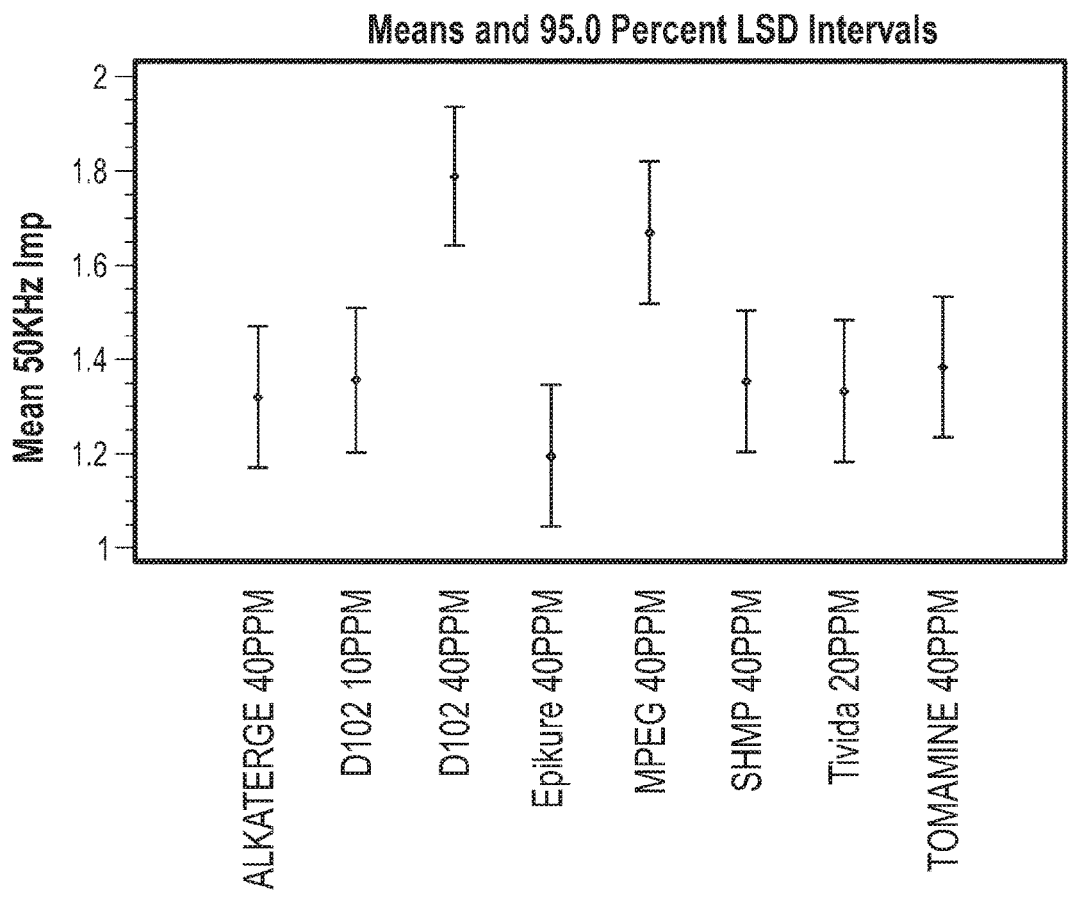
FIG. 4 is an illustration of the results of Example 3 showing true internal resistance at 50 KHz of various samples.
Figure 5:
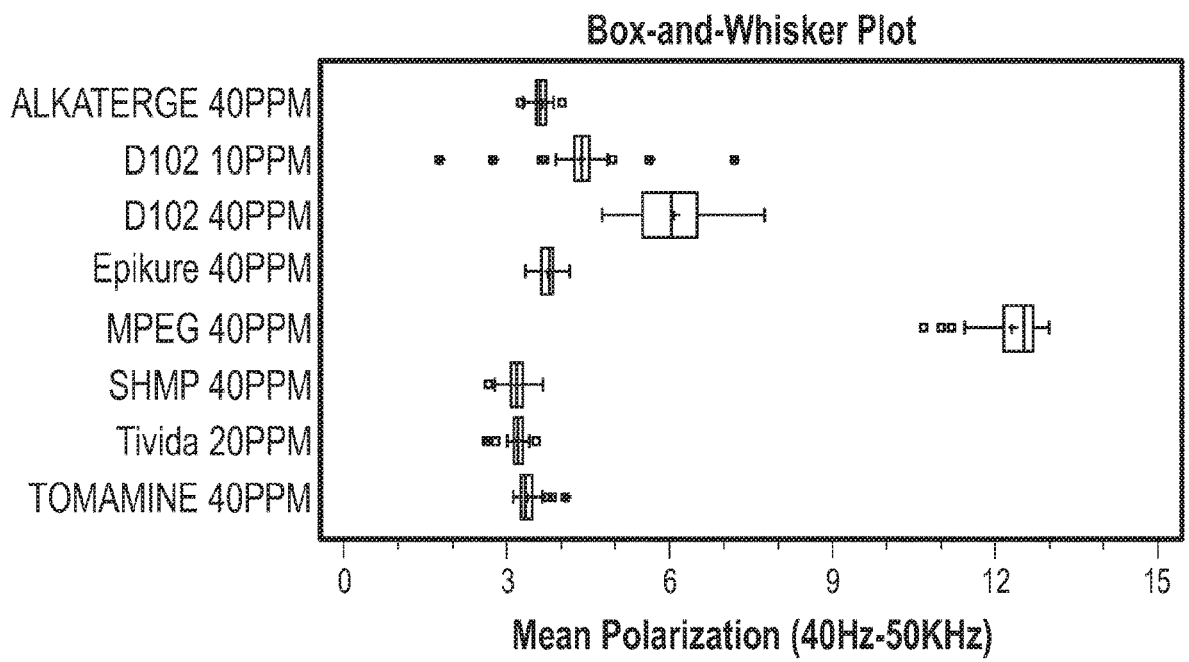
FIG. 5 is an illustration of the results of Example 3 showing polarization at 40 Hz minus 50 KHz of various samples.

Impedance results were summarized at two weeks of product age for true IR at 50 KHz impedance measured on a Quadtech instrument (See FIG. 4) as well as for polarization based on 40 Hz minus 50 KHz (See FIG. 5).

The 50 KHz impedance was overlapping for all surfactants except the controls, D102 and Carbowax 550, at the 40 ppm concentration level. The 50 KHz impedance also shows that a small change in concentration can have a significant impact on cell properties. The ideal surfactant would be one in which after the critical concentration required to protect the zinc surface was achieved the system would be robust to excess quantities. One reason that this is a difficult balance is that excess surfactant can alter the viscosity of the electrolyte and the rheology properties of the anode binder.

Perhaps more important than the cell resistance, is the polarization which is associated with film formation on the surface of the zinc and ion mobility. The difference between low frequency impedance linked to charge transfer and true resistance can be illustrated in a 40 Hz minus 50 KHz test.

In FIG. 5, the SHMP, Tivida, and Tomamine additives result in much lower charge transfer problems than either control D102 or mpeg 550 at the 40 ppm addition levels. If these films are not transient, one would expect the above trends to be observed in the close circuit voltage during product discharge.

Example 4

Figure 6:
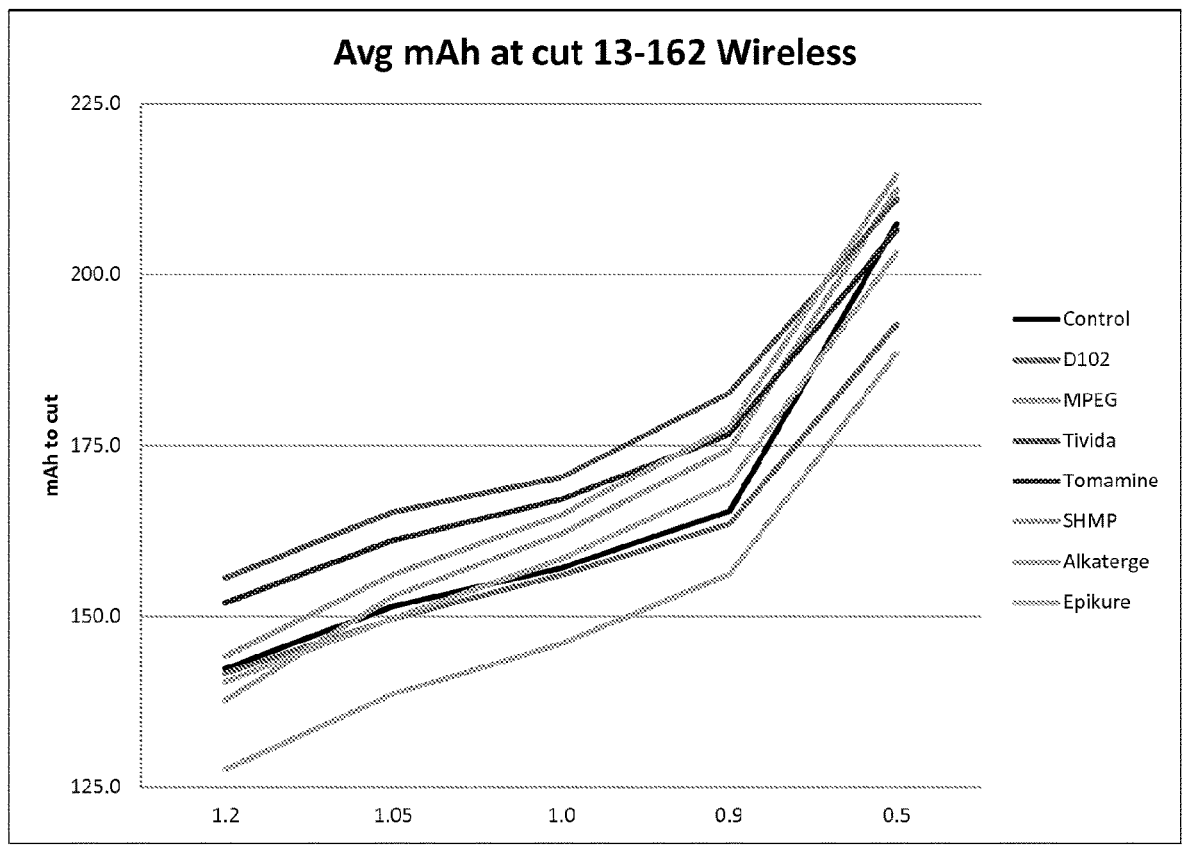
FIG. 6 is an illustration of the results of Example 4 showing service of various samples to various functional end points.

AZ13 size air cells were characterized on three application tests: 3 mA continuous, 3 mA background with a 12 mA pulse for 100 msec—IEC, and a 3 mA background with a 5 mA extended pulse for 15 minutes—wireless. Results are shown below in Table 3 in mAh, in order of worst to best performance. The Control is again an identical sample with no surfactant added. In FIG. 6, service to various functional end points are shown, with Tivida showing the best service, and always performing well above the control construction.

TABLE 3

| 3 mA | | |
|---|---|---|
| Lot | Surfactant | 1.05 |
| 3 | MPEG | 193 |
| 1 | Control | 202 |
| 8 | Epikure | 206 |
| 5 | Tomamine | 214 |
| 7 | Alkaterge | 216 |
| 4 | Tivida | 219 |
| 2 | D102 | 220 |
| 6 | SHMP | 222 |

| IEC | | |
|---|---|---|
| Lot | Surfactant | 1.05 |
| 8 | Epikure | 187 |
| 5 | Tomamine | 197 |
| 6 | SHMP | 198 |

TABLE 3-continued

| 7 | Alkaterge | 202 |
|---|---|---|
| 1 | Control | 203 |
| 2 | D102 | 207 |
| 4 | Tivida | 210 |
| 3 | MPEG | 213 |

| Wireless | | |
|---|---|---|
| Lot | Surfactant | 1.10 |
| 8 | Epikure | 146 |
| 2 | D102 | 156 |
| 1 | Control | 157 |
| 7 | Alkaterge | 158 |
| 3 | MPEG | 162 |
| 6 | SHMP | 165 |
| 5 | Tomamine | 167 |
| 4 | Tivida | 170 |

From this performance testing, some observations were made. The controls were never the best performing product. Tivida is statistically always one of the best performing additives. Based on the results of this screening process Tivida was selected for additional characterization and concentration optimization studies.

Example 5

AZ13 size air cells were prepared using conventional anode dry powder processing. In the cell builds, the Tivida concentration was varied from 10, 20, 50, and 100 ppm. A control cell using the D102 zinc additive was also prepared. The prepared air cells were characterized on two application tests: 3 mA background with a 12 mA pulse for 100 msec—IEC, and a 3 mA background with a 5 mA extended pulse for 15 minutes—wireless. Results are shown below in Table 4 in minutes service to various functional end points. The service data once again shows an advantage for Tivida over D102 by about 15% for wireless and about 10% for IEC. It also supports the conclusion that the cell is robust to excess surfactant which provides a wide window for formulations. Tivida can be added well above the monolayer concentration without having a negative impact on electrolyte viscosity or low frequency impedance. Higher concentrations may actually be beneficial perhaps increasing ZnO solubility, hydroxyl ion distribution in combination with the binder, and improving high rate performance.

TABLE 4

| | Wireless 1.1 v FEP | | | | | IEC 1.0 V FEP | | | | |
|---|---|---|---|---|---|---|---|---|---|---|
| | Lot | | | | | | | | | |
| | 5 Control D102 Sol 2 | 6 Tivida 10 ppm Sol 2 | 7 Tivida 20 ppm Sol 2 | 8 Tivida 50 ppm Sol 2 | 9 Tivida 100 ppm Sol 2 | 5 Control D102 Sol 2 | 6 Tivida 10 ppm Sol 2 | 8 Tivida 50 ppm Sol 2 | 9 Tivida 100 ppm Sol 2 | 7 Tivida 20 ppm Sol 2 |
| | 130 | 144 | 136 | 125 | 166 | 189 | 200 | 214 | 208 | 231 |
| | 141 | 152 | 177 | 155 | 158 | 222 | 230 | 222 | 228 | 224 |
| | 111 | 130 | 142 | 180 | 158 | 214 | 206 | 229 | 222 | 232 |
| | 133 | 152 | 153 | 158 | 150 | 223 | 204 | 204 | 222 | 229 |
| | 141 | 161 | 164 | 147 | 164 | 187 | 228 | 232 | 226 | 213 |
| | 150 | 152 | 166 | 142 | 169 | 168 | 222 | 227 | 222 | 227 |
| Average | 134.3 | 148.5 | 156.3 | 151.2 | 160.8 | 200.5 | 215.0 | 221.3 | 221.3 | 226.0 |
| Stdev | 13.4 | 10.5 | 15.6 | 18.3 | 6.9 | 22.5 | 13.2 | 10.6 | 7.0 | 7.0 |

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:

1. An alkaline electrochemical cell, comprising:
a container, a negative electrode, a positive electrode, wherein said negative electrode and said positive electrode are disposed within the container, a separator located between the negative electrode and the positive electrode, and an alkaline electrolyte, wherein the negative electrode comprises zinc and a sulfotricarballylate surfactant;
wherein the sulfotricarballylate is present in an amount from 100 to 1,000 ppm based on the total weight of the zinc.

2. The cell according to claim 1, wherein the sulfotricarballylate is characterized by the formula

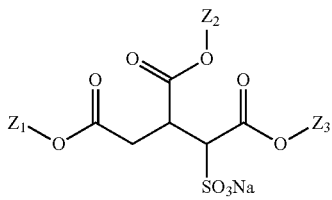

(Ia)

and where $Z_1=Z_2=Z_3=F_3C(CF_2)_{ai}(CH_2)_{bi}(O(CH_2)_{ci})_{di}$—, where ai =1-2, bi =1-2, ci =2, and di =1-3.

3. The cell according to claim 1, wherein the sulfotricarballylate is characterized by the formula

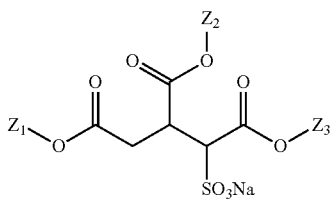

(Ia)

and where $Z_i=Z_2=Z_3=F_3C(CF_2)(CH_2)(O(CH_2CHCH_2CH_3))$.

4. The cell according to claim 1, wherein the sulfotricarballylate contains three fluorinated end groups.

5. The cell according to claim 1, wherein the sulfotricarballylate0 is in the form of a mixture.

6. The cell according to claim 1, wherein the positive electrode comprises manganese dioxide.

7. The cell according to claim 1, wherein the positive electrode is an air electrode.

8. The cell according to claim 4, wherein each of said fluorinated end groups comprises $F_3C(CF_2)_2$.

9. The cell according to claim 4, wherein each of said fluorinated end groups comprises $F_3C(CF_2)$.

10. An alkaline electrochemical cell, comprising:
a container; an electrode assembly disposed within the container and comprising a negative electrode, a positive electrode, a separator located between the negative electrode and the positive electrode, and an alkaline electrolyte, wherein the negative electrode comprises zinc and a fluorosurfactant, wherein said fluorosurfactant has more than one fluorinated end group;
wherein the sulfotricarballylate is present in an amount from 100 to 1,000 ppm based on the total weight of the zinc.

11. The cell according to claim 10, wherein said fluorosurfactant has three fluorinated end groups.

12. The cell according to claim 10, wherein said fluorosurfactant further has an anionic polar group.

13. The cell according to claim 10, wherein said fluorinated end groups are identical.

14. The cell according to claim 10, wherein said fluorosurfactant is of the formula

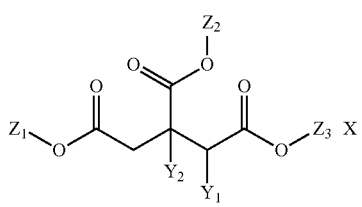

(I)

where the groups $Z_1$, $Z_2$, and $Z_3$ are, independently of one another, branched or unbranched alkyl groups or groups of the structure $R_i(A9CR_1R_2)_{ci}$—$(CR_3R_4)_{c'i})_{di}$—, where the respective indices ci and c'i are, independently of one another, 0-10, and di =0-5, where $R_i$ is a branched or unbranched, fluorine-containing alkyl radical, $R_1$ to $R_4$ are, independently of one another, hydrogen or a branched or unbranched alkyl group, ci and c'i are not simultaneously $_0$, and A=O, S and/or N, $Y_1$ is an anionic polar group and $Y_2$ is a hydrogen atom, or vice versa,
X is a cation, and at least one of the groups $Z_1$, $Z_2$, and $Z_3$ is a group of the structure $R_i(A(CR_1R_2)_{ci}$—$(CR_3R_4)_{c'i})_{di}$—.

15. The cell according to claim 12, wherein said anionic polar group is a sulfonate group.

16. The cell according to claim 7, wherein the surfactant forms at least one monolayer on the surface of said zinc.

17. The cell according to claim 10, wherein said fluorosurfactant has a molecular weight of between 800 and 1320.

18. The cell according to claim 1, wherein the sulfotricarballylate is characterized by the formula

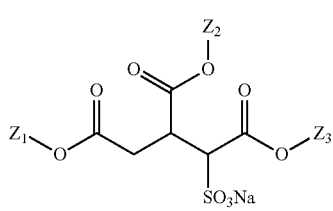

(Ia)

and where $Z_i=Z_2=Z_3=F_3C(CF_2)(CH_2)(O(CH_2CH_2CH_2CH_2))$.

* * * * *

UNITED STATES PATENT AND TRADEMARK OFFICE
CERTIFICATE OF CORRECTION

PATENT NO. : 10,826,060 B2
APPLICATION NO. : 16/437429
DATED : November 3, 2020
INVENTOR(S) : Jack Marple Page 1 of 1

It is certified that error appears in the above-identified patent and that said Letters Patent is hereby corrected as shown below:

In the Claims

Column 13 Claim 5, Line 32 should read, "sulfotricarballylate is in the form of a mixture."

Column 14 Claim 14, Line 26 should read, "and c'i are not simultaneously 0, and A = O, S and/or N."

Signed and Sealed this
Second Day of February, 2021

Drew Hirshfeld
*Performing the Functions and Duties of the
Under Secretary of Commerce for Intellectual Property and
Director of the United States Patent and Trademark Office*